United States Patent [19]
Finestone et al.

[11] Patent Number: 5,244,702
[45] Date of Patent: Sep. 14, 1993

[54] PAPER-PLASTIC LAMINATE SHEETING

[76] Inventors: Arnold B. Finestone, 51 Indian Dr., Woodcliff Lake, N.J. 07675; Gilbert Bloch, 3349 St. Malo Ct., Palm Beach Gardens, Fla. 33410

[21] Appl. No.: 818,544
[22] Filed: Jan. 9, 1992
[51] Int. Cl.$^5$ .............................................. B29D 22/00
[52] U.S. Cl. .................................. 428/34.3; 428/195; 428/511; 428/537.5
[58] Field of Search .................... 428/511, 537.5, 34.2, 428/34.3, 195

[56] References Cited
U.S. PATENT DOCUMENTS
4,254,173 3/1981 Peer ..................................... 428/204

FOREIGN PATENT DOCUMENTS
1569447 6/1980 United Kingdom .

Primary Examiner—Edith Buffalow
Attorney, Agent, or Firm—Michael Ebert

[57] ABSTRACT

A paper-plastic laminate sheeting capable of being converted by conventional equipment into envelopes, grocery bags and other dilatable container products that initially are in a flat state and are normally made of paper. The sheeting is composed of a paper facing sheet cold-laminated by means of a water-based adhesive to a reinforcing film of synthetic plastic material, such as polypropylene. The film is oriented to impart exceptional tear and burst strength characteristics to the resultant waterproof product. The product, whose exterior surface is formed by the paper facing sheet, is readily printable. For some applications, a second paper facing sheet is cold-laminated to the other side of the film to produce a three-ply laminate sheeting whose exposed surfaces are readily printable and can accept conventional adhesives.

9 Claims, 1 Drawing Sheet

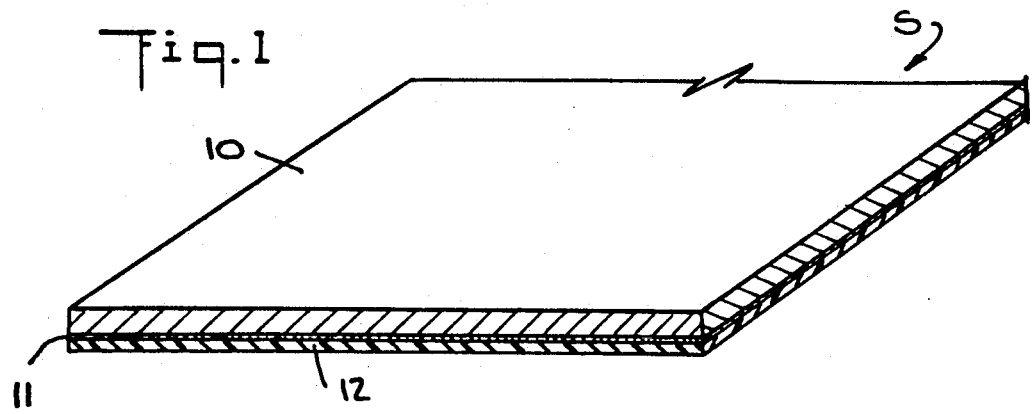
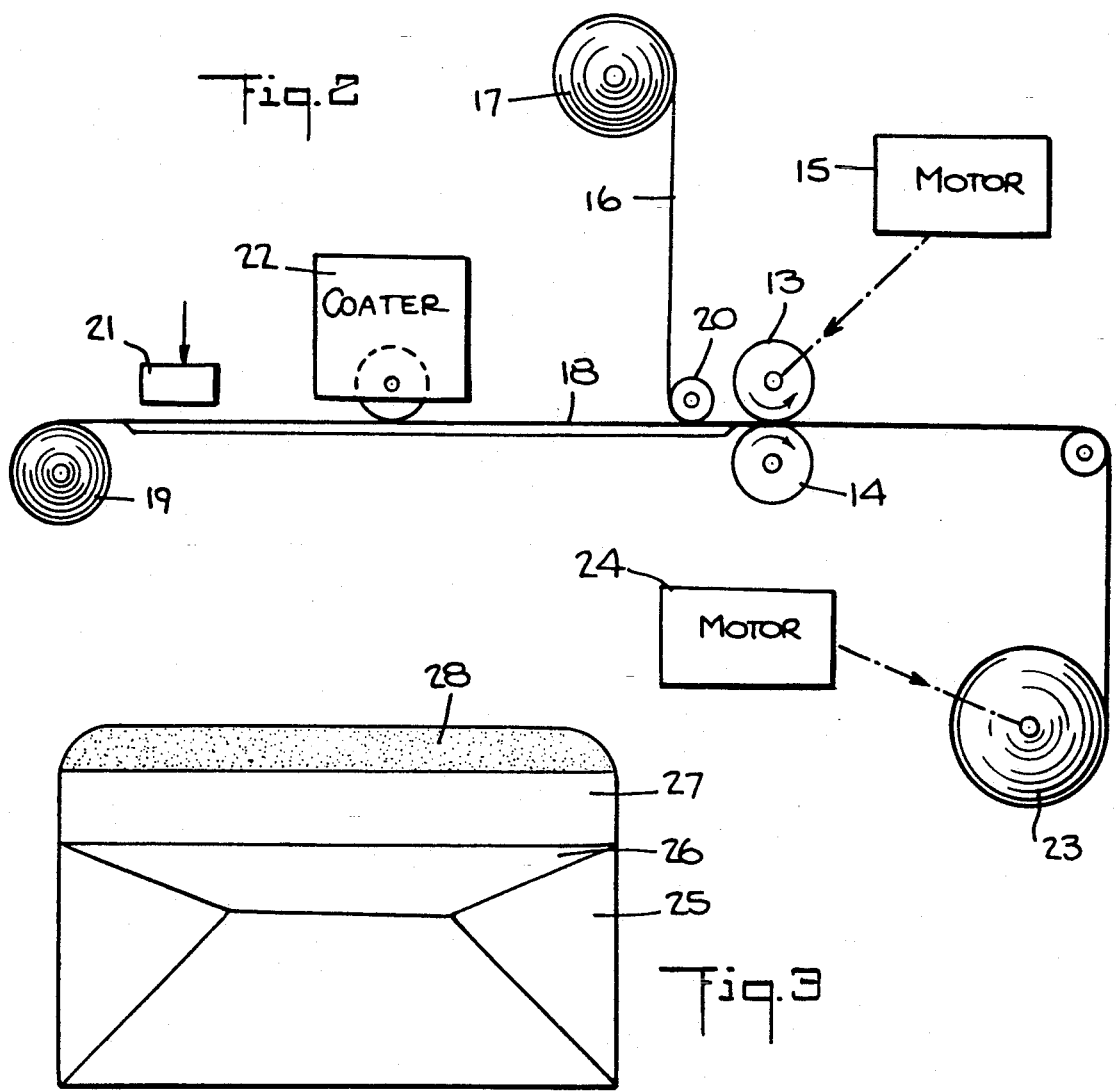

PAPER-PLASTIC LAMINATE SHEETING

BACKGROUND OF INVENTION

1. Field of Invention

This invention relates generally to paper-plastic laminate sheeting capable of being converted into envelopes, bags and other dilatable container products which initially are in a flat state and are normally made of paper, and more particularly to a laminate sheeting in which a paper facing sheet is cold-laminated to an oriented film of synthetic plastic material.

2. Status of Prior Art

The sheeting traditionally used in making envelopes, grocery bags and other types of dilatable container products which initially are in a flat state is paper. Paper is a semi-synthetic material made by chemically processing cellulose fibers.

Apart from its low cost, an important advantage of paper is that it can be converted into envelopes and other types of dilatable container products by means of high speed equipment that functions to cut and fold the sheeting into the desired configuration, the folds and flaps of the product being bonded together, where necessary, by standard low-cost adhesives. Another advantages of paper in this context is that it can readily be printed and colored, using standard inks for this purpose.

But such paper products suffer from several disadvantages, for they are characterized by low tear and burst strength, and are by no means water resistant; for unless coated, paper is highly absorbent.

Also well known in the art are plastic-coated cellulosic papers, these being used chiefly in children's books, posters, signs and shipping tags, and for other purposes demanding resistance to hard wear and to outdoor exposure. However, such plastic-coated papers lack high tear and burst strength. Also low in strength are special purpose coated papers covered on one or both sides with a suspension of clays, starches, rosin or wax, or a combination of these substances.

To overcome the drawbacks of paper-fabricated dilatable container products, in recent years such products have been made of TYVEC or other polymeric synthetic plastic sheeting. The resultant products not only have a tear and bursting strength far superior to paper, but they are also waterproof.

However, TYVEC and similar synthetic plastic sheeting is difficult to convert into envelopes and other dilatable container products using high-speed equipment of the type mainly suitable for paper. As a consequence, production scrap rates can run as high as thirty percent, thereby raising the cost of manufacturing these products. Moreover, such plastic sheeting has a low chemical affinity for standard adhesives; hence in the case of envelopes, one must then use a special and more costly adhesive on the flaps. And such plastic sheeting also has a low affinity for standard printing inks, and the products, therefore, demand special printing inks for this purpose.

SUMMARY OF INVENTION

In view of the foregoing, the main object of this invention is to provide a paper-plastic laminate sheeting capable of being converted by conventional equipment of the type heretofore used with paper, into envelopes, grocery bags and other types of dilatable container products which initially are in a flat state.

More particularly, an object of this invention is to provide a sheeting of the above type in which a facing paper sheet is cold-laminated to a reinforcing film of synthetic oriented plastic material, whereby the properties of the oriented film are unimpaired and the products made therefrom have exceptional tear and burst characteristics.

Among the salient advantages of paper-plastic laminate sheeting in accordance with the invention are the following:

A. The products fabricated therefrom are waterproof.

B. The paper facing of the laminate sheeting has a high affinity for standard printing inks, so that the products made therefrom can readily be printed and colored.

C. A standard starch or pressure-sensitive adhesive may be used on the flaps of envelopes formed of the laminate sheeting.

D. The sheeting can be converted into products by conventional equipment for this purpose with miniminum scrap in a range in a range comparable to the scrap rate encountered in making paper envelopes and other dilatable container products.

Also an object of this invention is to provide a system for carrying out at high speed a preferred technique for producing a laminate sheeting.

Briefly stated, these objects are attained in a paper-plastic laminate sheeting capable of being converted by conventional equipment into envelopes, grocery bags and other dilatable container products that initially are in a flat state and are normally made of paper. The sheeting is composed of a paper facing sheet is cold-laminated by means of a water-based adhesive to a reinforcing film of synthetic plastic material, such as polypropylene. The film is oriented to impart exceptional tear and burst strength characteristics to the resultant waterproof product. The product, whose exterior surface is formed by the paper facing sheet, is readily printable.

For some applications, a paper facing sheet is cold-laminated to the other side of the film to produce a three-ply laminate sheeting whose exposed surfaces are readily printable and can accept conventional adhesives.

BRIEF DESCRIPTION OF DRAWINGS

For a better understanding of the invention as well as other objects and further features thereof, reference is made to the following detailed description to be read in conjunction with the accompanying drawings, wherein:

FIG. 1 illustrates a flexible, paper-plastic laminate sheeting in accordance with the invention;

FIG. 2 shows, in schematic form, a system adapted to produce the sheeting; and

FIG. 3 shows the rear side of an envelope fabricated from the sheeting.

DESCRIPTION OF INVENTION

Paper-Plastic Laminate Sheeting

Referring now to FIG. 1, shown therein in an enlarged scale is a flexible paper-plastic sheeting S in accordance with the invention. Sheeting S includes a paper facing sheet 10 whose gauge, weight and quality are appropriate to the end use for which the sheeting is intended. Thus if the end use in a grocery bag, the paper sheet may then be of good quality, unbleached Kraft paper, whereas if the end use is an envelope, then a white or colored paper appropriate to the intended type of the envelope is included in the laminate sheeting. In some cases, as where the product to be produced is an attractive shopping bag of high quality, a coated paper sheet may then be used for this purpose.

Cold-laminated by an adhesive layer 11 to the undersurface of paper facing sheet 10 is a reinforcing film 12 of synthetic plastic material which is preferably transparent and is uniaxially or biaxially-oriented. Film materials suitable for this purpose are polypropylene, polyethylene, nylon or a polyester such as MYLAR.

The tensile strength of a synthetic plastic film is substantially increased by orientation which results in molecular orientation of the film. In the case of biaxial orientation, orientation is in both the longitudinal and transverse directions. This is usually effected by controlled stretching of the unoriented film.

The tensile strength of an oriented film is seriously impaired if heat is applied thereto, for the heat acts 1 to relax the film and cause it to lose its molecular orientation. Thus when biaxially oriented Mylar film panels are superposed and sealed together by heat and pressure applied along a line running along the panels, the film may then be easily torn along this line.

This is the reason why in the present invention the use of hot melt adhesives to laminate a reinforcing film to the undersurface of the paper sheet is interdicted; for to do so would seriously diminish the reinforcing characteristics of the film.

In the present invention, the plastic film is cold laminated to the paper sheet under pressure and at room temperature by means of a water-based polyacrylate copolymer adhesive, or by any other water-based adhesive having similar bonding properties and having an affinity both for the paper sheet and the plastic film.

Since paper tends to absorb water in the laminating process, before the paper sheet and the film are together fed into pressure rolls and subjected to pressure to effect lamination, the inner surface of the film is first coated with the water-based adhesive which does not encounter the inner surface of the paper sheet until these two surfaces meet in the pressure rolls. In this way, the period during which absorption of the adhesive into the interior of the paper sheet can take place is limited.

And to render the inner surface of the film more receptive to the water-based adhesive applied thereto, it is preferably first subjected to ionization to enhance the dynes on this surface.

The Lamination System

FIG. 2 shows a system for carrying out a preferred technique for effecting cold lamination of the paper sheet and a plastic oriented reinforcing film to produce a two-ply laminate sheeting.

The system includes a combining station having a pair of cooperating pressure rolls 13 and 14 driven at high speed by a motor 15. The nip between the rolls is related to the thickness of the webs to be laminated and is adjusted to provide the required degree of laminating pressure to ensure secure bonding of the webs. Fed concurrently into the nip of the pressure rolls is a web of paper 16 drawn from a supply reel 17, and a web of film 18 drawn from a supply reel 19.

Reel 17 is supported at an elevated position, web 16 being drawn down from this reel in a vertical path and being guided by an idler roll 20 into a horizontal path leading to the combining station. Film supply reel 19 is supported at a position to feed the film in a horizontal path toward the combining station, reel 19 being placed well in advance of this station to expose a stretch of film web 18 before it enters the nip of the combining rolls.

Along the stretch just above web 18 is an ionization bar 21 which functions to ionize the inner surface of film web 18 to increase the dynes of the surface preparatory to the application of a water-based adhesive thereto. Then applied onto the inner surface of film web 18 by means of an adhesive applicator 22 is a coating of water-based adhesive. It is not essential that the coating fully cover this surface, for in practice the roll of the adhesive applicator may take the form of a series of rings to apply parallel strips of adhesive to the film surface.

Hence when the adhesive-coated film web and paper web 16 together enter the combining station and are subjected to pressure by pressure rolls 13 and 14, lamination is effected by this action. The laminated webs are then wound on an output reel 23 driven by a motor 24. The operation of motors 15 and 24 are synchronized; for these motors function to draw the webs from the supply reels.

In practice, the system may be driven by the motor to operate at a speed of 150 to 500 feet per minute, or at an even greater rate. The operating speed is limited by the strength of the paper web, for with a relatively thin paper web of low strength, the speed must be such as not to rupture the paper web. Hence while the oriented film can tolerate high speeds, the speed cannot exceed that which can be tolerated by the paper web.

The two-ply paper-plastic laminate sheeting wound on output reel 23 may now be used in exactly the same manner as a reel of ordinary paper as the stock roll for standard equipment adapted to fabricate envelopes, bags or other dilatable paper products, by slitting, folding and whatever other operations are dictated by the form of the product.

In some applications, a three-ply paper-plastic-paper laminate sheeting may be desirable. In this laminate, paper sheets are cold-laminated to the opposite sides of the oriented plastic reinforcing film. The film, which is then sandwiched between the paper sheets, serves to impart exceptional high-strength physical properties to the laminate.

In practice, a three-ply laminate can be produced in a two-stage system; the first stage being a laminate of the type shown in FIG. 2 in which a paper web is cold-laminated to one side of a film web to produce a two-ply sheeting wound on output roll 23. In the second stage, a like laminate is used, but in this stage, a two-ply web drawn from roll 23 is then cold-laminated on its exposed film side to a web of paper drawn from a paper roll, so that wound on the output roll of the second laminate is the three-ply laminate sheeting.

A problem encountered with two-ply paper-film laminate sheeting is that this sheeting tends to curl because of the dissimilar properties of the plies. Such curling is not desirable in products such as envelopes, though it may not be objectionable in other products. But when, however, the oriented film ply is sandwiched between two like plies of paper, the resultant symmetry avoids the problem of curling.

The three-ply laminate sheeting has another important advantage, for now both exposed surfaces are paper. This makes it possible when the three-ply laminate sheeting is being converted in standard equipment for this purpose into an envelope or grocery bag in which the sheeting is slit and folded to form flaps or other elements which must be sealed together, to use conventional, commercially available adhesives for this purpose, rather than the special adhesives that would be dictated if the surfaces to be sealed together included a plastic film surface. And because all exposed surfaces of the three-ply sheeting are paper, they can be readily printed.

The Product

An example of a product fabricated from a three-ply paper-plastic laminate sheeting in accordance with the invention is shown in FIG. 3, this being an envelope.

The envelope has the form of a conventional paper envelope, except that its exterior surface 25 is one paper facing sheet component of the laminate and its interior surface 26 is the other paper component thereof, the film component being sandwiched between the paper components. The flap 27 of the envelope is provided with an adhesive band 28 which may be a standard starch adhesive or a pressure-sensitive adhesive.

While there have been shown and described preferred embodiments of a paper-plastic laminate sheeting in accordance with the invention, it will be appreciated that many changes and modifications may be made therein without, however, departing from the essential spirit thereof.

We claim:

1. A flexible paper-plastic laminate sheeting capable of being converted by conventional equipment into envelopes, bags and other dilatable container products normally made of paper which initially are in a flat state, said sheeting comprising:
    (a) a printable paper outer facing sheet having an inside surface; and
    (b) a reinforcing film of synthetic oriented plastic material having an inner surface treated to increase its dynes and its affinity to adhesives, said film being cold-laminated by a water-based adhesive to the surface of the facing sheet whereby the product made from the sheeting which has a printable paper exterior has exceptional tear and burst strength.

2. A laminate sheeting as set forth in claim 1, wherein said film is biaxially oriented.

3. A laminate sheeting as set forth in claim 1, wherein said water-based adhesive is a polyacrylate copolymer.

4. A sheeting as set forth in claim 1, wherein the film is formed of polypropylene.

5. A sheeting as set forth in claim 1, wherein the paper facing sheet is formed by Kraft paper.

6. A sheeting as set forth in claim 1, wherein the paper facing sheet is formed of coated paper.

7. A sheeting as set forth in claim 1, wherein said film is formed of polyethylene.

8. A laminate sheeting as set forth in claim 1, in which a paper facing sheet is cold-laminated to opposite sides of the reinforcing film to produce a non-curling, three-ply laminate sheeting.

9. A product fabricated of a laminate sheeting as set forth in claim 1, wherein the paper facing sheet of the laminate is the printable exterior of the product and the film is the interior thereof.

* * * * *